United States Patent Office 3,556,574
Patented Jan. 19, 1971

3,556,574
DEVICE FOR LOCKING
Paul Parry, 14 Rue Emile Lacoste,
Brive, Correze, France
Filed May 16, 1969, Ser. No. 825,179
Claims priority, application France, May 17, 1968,
152,423; Mar. 26, 1969, 6,908,841
Int. Cl. E05c *3/04;* E05d *1/04;* A47c *1/027*
U.S. Cl. 292—280                                    15 Claims

ABSTRACT OF THE DISCLOSURE

A device for locking, in at least one direction, two members which are movable in rotation with respect to each other. It can take the form of a bolting device for a doorlock, a tilting window element, or a seat having a back with adjustable inclination.

A cylindrical bore is formed in one of the members and receives two semi-cylindrical segments urged into contact with said bore and carried by the other member. One of the segments is provided with an interacting element in order to create the locking effect. When a torque is applied which would tend to set the two members in relative rotation, a locking effect is caused by reason of the radial expansion of the corresponding segment by the clamping effect of the element carried by this segment in contact with the interacting element.

---

The present invention has for its object a device for locking, in at least one direction, two members which are movable in rotation with respect to each other. More precisely, this device makes it possible to prevent rotation in at least one direction of a member rotatably mounted on a fixed member, unless a special control cancels this prohibition so as to permit rotation in this direction. A device of this kind can be employed in numerous applications; in particular, it can take the form of a bolting device for a door-lock. When the locking action takes place in both directions, the device can form part of a locking articulation, incorporated for example in the mounting of a tilting window element, or in the construction of a vehicle seat having a back with adjustable inclination.

The device according to the invention is characterized in that in one of the members there is formed a cylindrical bore which receives two semi-cylindrical segments urged into contact with the bore and carried by the other member, which comprises at least one element interacting with an element provided on one of the segments in order to create the locking effect, these elements forming a cam and a counter-cam, following an arrangement such that when the segments are in the free condition in the bore, a torque applied in a direction for which a locking effect is desired and which would tend to set the two members in relative rotation, causes a locking by friction due to the radial expansion of the corresponding segment by the clamping effect of the element carried by this segment in contact with the interacting element, and control means is provided for bringing the two segments closer together and thus for freeing them with respect to the bore, so as to permit free rotation in both directions of one member with respect to the other.

It is known to utilize semi-cylindrical segments for the locking by friction of a rotating member, in particular from French Patents Nos. 590,040 and 1,293,564. The device according to the present invention represents however a new conception of locking by friction and a new application of the means disclosed in these two patents.

In the practical construction of the device according to the invention, the bore can be formed in the moving member and the two segments may comprise for example one or two axial key-pins, depending on whether the locking takes place in one direction or in the other, and which constitute one or two counter-cams with respect to one or two cams or sloping faces formed in the fixed member. The means provided for liberating the segments and permitting rotation of the moving member may be constituted by a lever articulated on one of the segments and provided with a surface having a cam effect in co-operation with a lug on the other segment so as to create a movement of contraction of the two segments.

Forms of embodiment of the invention and alternative forms of construction will be described below by way of example, reference being made to the accompanying drawings, in which.

Figure 1:
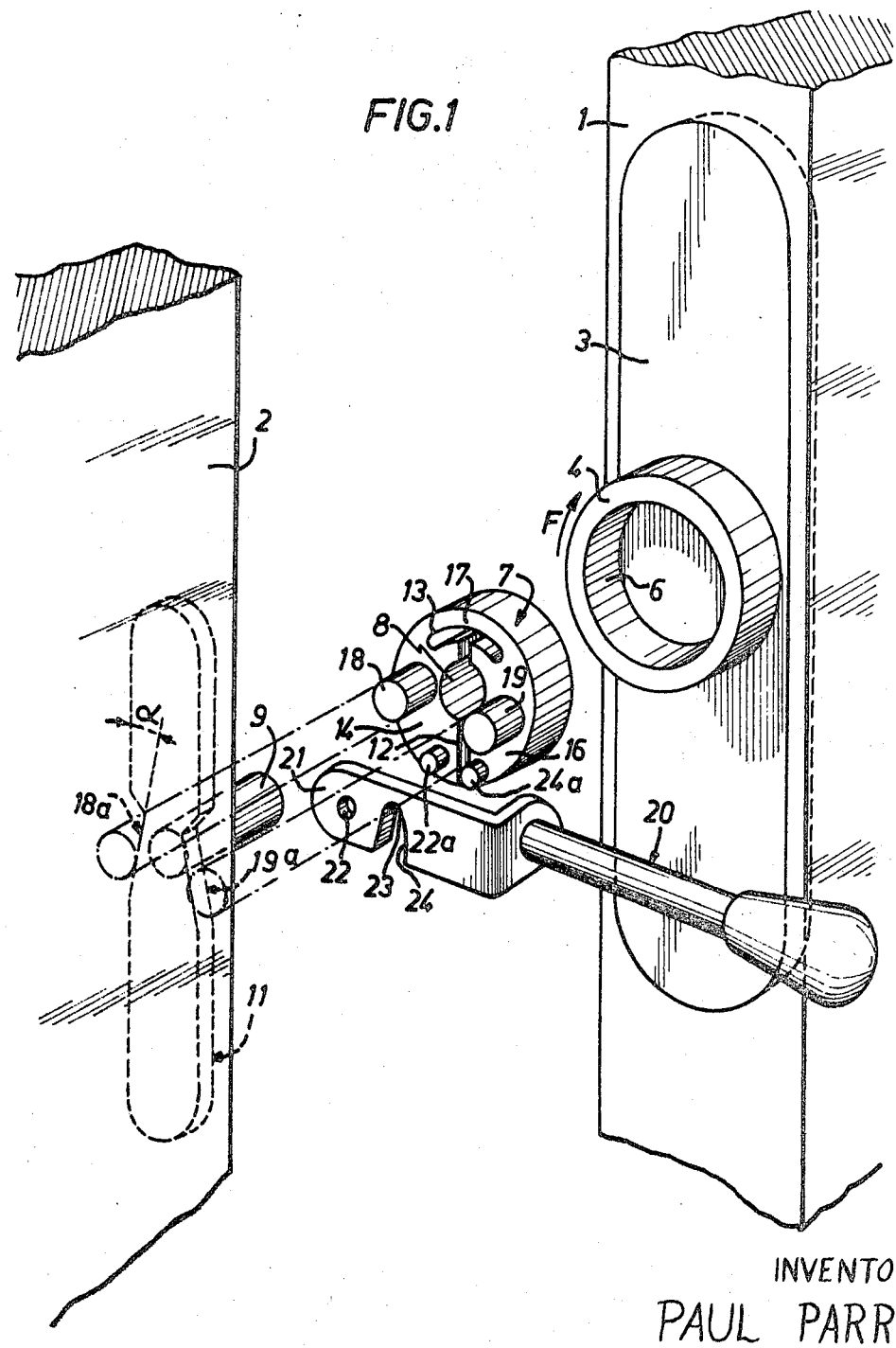
FIG. 1 is an exploded view in perspective of an articulation for a window frame with an incorporated lock.

In FIG. 1, the locking device is applied to the mounting on a fixed frame 2 of a swinging window frame 1. On the edge of the pivoted frame 1 is fixed a plate 3 which is integral with a cylindrical sleeve 4, the bore 6 of which receives a ring 7, which plays the part of an articulation shaft for the frame 1. To this end, the ring 7 is pierced with an axial cylindrical hole 8 which is formed in an eccentric position on a vertical diameter of the ring 7, and in which is passed a cylindrical stud 9 rigidly fixed to a plate 11 fixed on the corresponding upright member of the fixed frame 2.

The ring 7 comprises a vertical diametral slot 12 which opens into the lower part of the ring, passes across the axial hole 8 and terminates in a circumferential slot 13 formed in the upper part of the ring and having the form of an arc concentric with the ring, so that this ring is made-up of two half-rings or segments 14, 16, coupled to each other by a cylindrical strip 17, the outer face of which is constituted by the periphery of the ring while the inner face corresponds to the concavity of the circumferential slot 13. The blade 17 plays to some extent the part of an articulation and gives the ring elasticity which enables it to be subjected to expansion or contraction.

The geometry of the ring 7 is such that before mounting, it can only be introduced into the bore 6 of the sleeve 4 by means of a slight elastic contraction, so that when the two cylindrical segments 14, 16 are inserted in the sleeve 4, they are urged into contact with the bore 6 by the pre-stress due to the initial contraction.

The flat face of the ring 7 adjacent to the frame 2 is further provided with two axial pins 18, 19, arranged symmetrically on the respective segments with respect to the diametral slot 12, and are in contact with two sloping faces 18a, 19a, formed in the opposite faces of the vertical edges of the plate 11. These sloping faces form a very acute agle α with the vertical.

The radial gripping action of the periphery of the ring 7 in contact with the bore 6 can be released by a movement of contraction of the ring by means of a lever 20, which is provided at one of its extremities with a blade 21, the respective faces of which are applied against the end face of the ring 7 and against the outer face of the plate 11. This blade 21 comprises, on the one hand a hole 22 in which is engaged a stud 22a forming an articulation, provided at the lower part of the cylindrical segment 14, and on the other hand a notch 23, which forms a surface 24 acting as a cam and is traversed by a stud 24a arranged on the segment 16 and forming a counter-cam with respect to the surface 24, the profile of which is such that a downward movement imparted by hand to the lever 20 causes the two studs 22a, 24a, to be brought closer together and results in a contraction of the ring 7 which ensures the release of the ring 7 with respect to the bore 6.

When a torque is applied on the window frame 1 in the direction of the arrow F, the intial clamping of the ring 7 in contact with the bore 6 tends to drive this ring in rotation which has the effect of forcing the pin 19 into contact with the sloping face 19a of the plate 11, this action having in turn the consequence of creating a radial expansion of this segment 16, which causes a powerful locking of this segment against the bore 6, thus preventing any rotation in the direction F of the frame 1.

The eccentricity of the stud 9 engaged in the ring 7 produces in its turn a reaction which also tends to cause an expansion of the second segment 14 in contact with the bore, so that the locking effect is thereby increased.

It is clear that a torque in the direction opposite to F applied on the frame 1, also results in a powerful locking action of the ring in the bore 6, due to the effect of the co-operation of the stud 18 with the sloping face 18a and of the reaction of the stud 9 on the segment 16.

In order to rotate the window-frame 1 in one direction or in the other, it is only necessary to push down the lever 20 by hand, which releases all clamping of the ring 7 in contact with the bore 6, thus liberating the frame 1.

Figure 2:
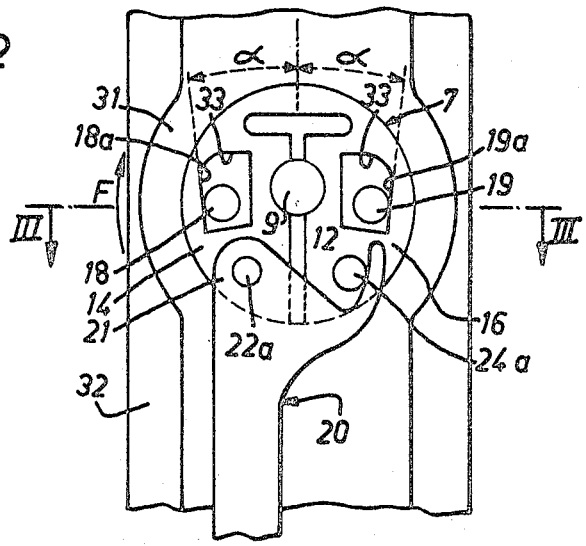
FIG. 2 is a view in elevation of another form of construction.
Figure 3:
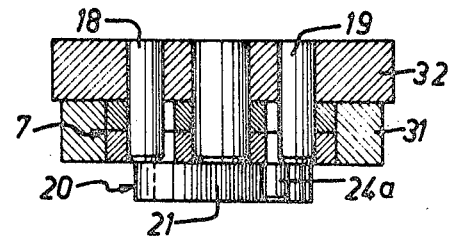
FIG. 3 is a view in cross-section taken along the line 3—3 of FIG. 2.

In the form of embodiment shown in FIGS. 2 and 3, the moving member 31 is directly in contact with the fixed element 32, the locking-release lever 20 being applied by its blade 21 against the free face of the rotating member 31.

Whereas in FIG. 1, the pins 18, 19 were fixed on the ring 7, in FIGS. 2 and 3, these pins are rigidly secured to the fixed member 32 and the ring 7 of FIG. 2 is correspondingly provided with two windows 33 through which the pins 18, 19 pass, these latter being each applied against a sloping face 18a, 19a formed in one of the edges of the windows 33 and which forms an angle α with the diametral plane defined by the slot 12 of the ring 7. The co-operation of the pins 18, 19 with the associated sloping faces, 18a, 19a, gives exactly the same effect when a torque is applied to the rotating member 31 as in the example of FIG. 1. The locking produced by the ring 7 can be released, as in the previous example, by acting on the lever 20 in the direction which brings closer together the two cylindrical segments 14 and 16.

Figure 4:
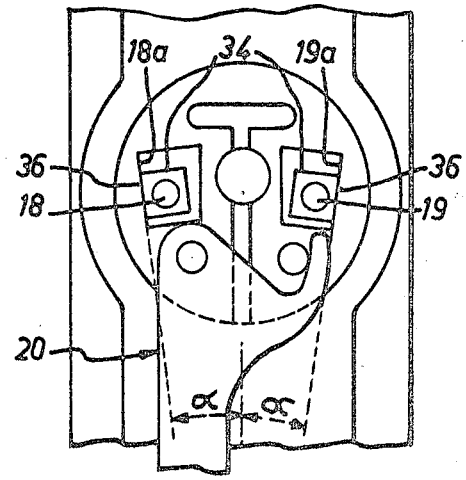
FIG. 4 is an alternative form of FIG. 2.

In the alternative form of embodiment shown in FIG. 4, the pins 18, 19 are provided with shoes 34 having a flat face 36 in contact with the sloping faces 18a, 19a, which reduces the contact pressure and makes it possible to transmit a higher radial clamping load.

Figure 5:
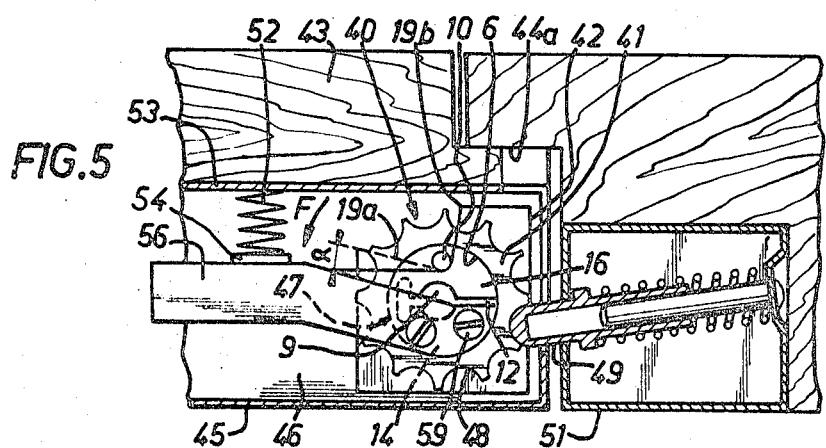
FIG. 5 represents a device incorporated in a lock for the door of a building.

The device 40 shown in FIG. 5, instead of insuring a locking effect in both directions, as in the previous examples, only locks the rotating element 41 with respect to the fixed element 42 in a single direction corresponding to the arrow F. This device is incorporated in a door-leaf 43 pivotally mounted by means of hinges (not shown) and which in the closed position is applied into contact with an upright door-casing 44.

The fixed element 42 forms a plate mounted on a horizontal face 46 of a casing 45 tailed into the door-leaf. This plate comprises a slot in which are formed two sloping faces 19a, 19b, the first face 19a being inclined at an angle α with respect to the plane of the door-leaf. With this sloping face 19a co-operates the pin 19 of a ring 47 which is similar in its arrangement and its operation, to the ring 7 of FIG. 1, but in which only the pin 19 is provided to prevent rotation in the direction F, rotation in the other direction being free.

The ring 47, which is retained on the mounting-plate 42 by the eccentric stud 9, is mounted in the bore 6 of the rotating portion 41, which is constituted by a pinion in the periphery of which are formed teeth hollows 48, in which there can be engaged a finger 49, slidably mounted in a striking-box 51 tailed into the upright 44, following an arrangement which is comparable with that described in French Patent No. 1,293,564.

The sloping face 19b having an orientation approximately radial with respect to the ring 47 and which forms an abtuse angle with the sloping face 19a, is also in a position adjacent to the pin 19. The function of this sloping face is to permit free rotation of the pinion 41 in the direction opposite to the arrow F, for the purpose of closing the door.

The pin 19 is forced into contact with the sloping face 19a by a spring 52 interposed between the wall 53 of the casing 45 and the supporting surface 54 of the lever 56. This lever 56 is rigidly fixed to the segment 14 of the ring 47 by means of two pins 59.

The displacement of the lever 56 in the direction opposite to that of the arrow F enables the mechanism, and therefore the door, to be released, the pin 19 rigidly fixed to the ring 47 being urged to come into contact with the radial face 19b of the fixed support 42.

When the door is open and it is pushed so as to close it, the contact of the finger 49 with a hollow 48 of the teeth of the pinion 41 causes a rotation of this latter in the direction opposite to the arrow F, until the door-leaf comes into abutment in the rebate 44a of the door-casing 44. As has already been explained above, this rotation is made possible by the interaction of the pin 19 and the sloping face 19b.

When the door is closed and a pressure is applied on it, this results in a tangential force on the pinion 41 at the contact with the finger 49, causing an expansion of the segments 14 and 16 by the effect of interaction of the pin 19 and the sloping face 19a, so that the ring 47 carries out its function of preventing opening.

Figure 7:
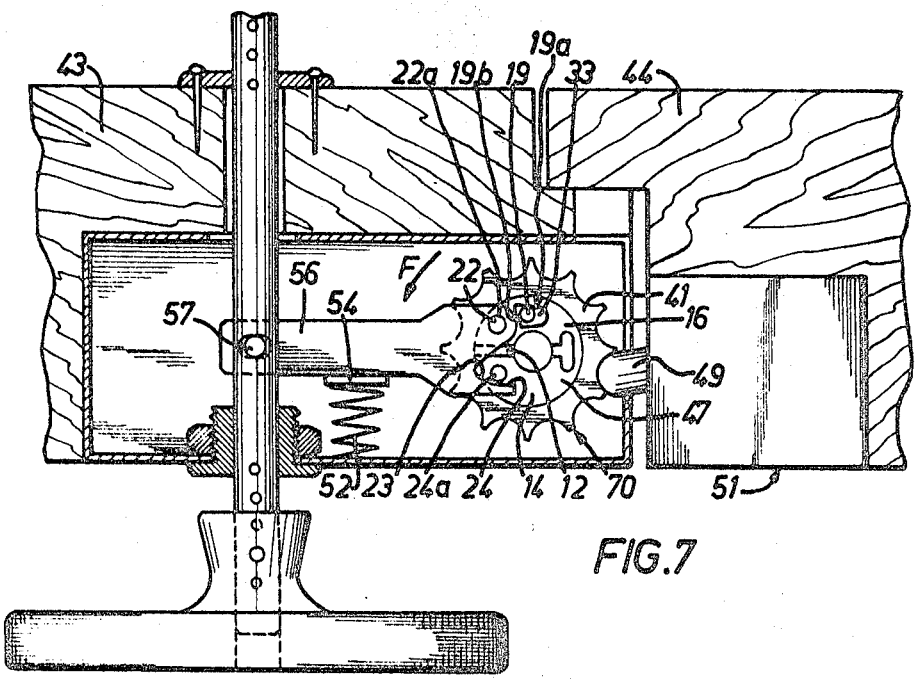
FIG. 7 shows an alternative form of the device shown in FIG. 5.

FIG. 7 shows an alternative form of the device of FIG. 5, in the same application to the door of a building. In this alternative, the lever 56 which is intended to release the ring 47, instead of having one extremity rigidly fixed to the segment 14 of the ring 47, is made following an arrangement similar to that of the lever 20 of FIGS. 2 and 4, namely that one of its extremities is free while the opposite extremity comprises on the one hand a hole 22 in which is engaged a stud 22a forming a pivot provided on the cylindrical segment 16, and on the other hand a notch 23 which forms a surface 24 acting as a cam and traversed by a stud 24a arranged on the segment 14 and constituting a counter-cam with respect to the surface 24, the profile of which is such that a movement in the direction of the arrow F impressed on the lever 56 causes a pivotal movement which has the effect of bringing the two segments 14 and 16 closer together.

The window 33 formed in the segment 16 comprises, in addition to the inclined edge 19a forming a sloping face with respect to the pin 19, an edge 19b having an approximately radial orientation and adjacent to the pin 19.

Figure 6:
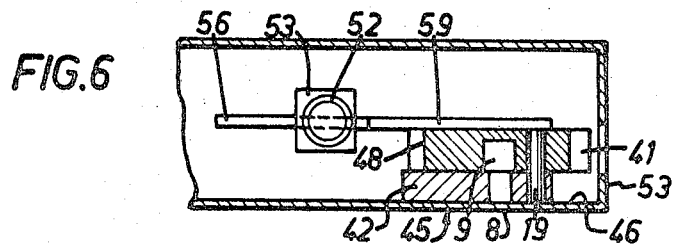
FIG. 6 is a view in longitudinal section of FIG. 5.

As in the case of FIGS. 5 and 6, the co-operation of the radial sloping face 19b with the pin 19 permits rotation of the pinion 70 in the direction opposite to the arrow F for closing the door, while the co-operation of the sloping face 19a with the pin 19 prevents the opening of the door unless the mechanism is released by acting on the lever 56 in the direction of the arrow F.

Although in the examples described, the segments 14, 16 form part of a single piece, it would be possible to make them separate from each other. In this case, the initial locking on contact with the ball 6 would be ensured by one or two springs engaged in the diametral slot 12.

Similarly, the eccentricity of the axial hole 8, although advantageous to the efficiency of the device, could be eliminated.

What I claim is:

1. A device for locking together, in at least one direction of movement, two members movable in rotation with respect to each other, said device comprising:

a cylindrical bore formed in one of said members;

two semi-cylindrical segments adapted to be housed in said bore and carried by said other member;

means for urging said segments into contact with said bore;

said other member comprising at least one first element adapted to co-operate with an at least one second element provided on at least one of said segments so as to produce a locking effect, said at least two co-operating elements forming respectively at least one cam and counter-cam in an arrangement such that, when said segments are free in said bore, a torque tending to cause relative rotation of said two members in a direction for which locking is desired, produces a frictional locking effect due to a radial expansion of the corresponding segment resulting from the clamping effect of said second element in contact with said first element;

and actuating means for bringing said two segments closer together and thereby freeing them from said bore, so as to permit free rotation of one member in both directions with respect to the other member.

2. A device as claimed in claim 1, in which said segments are made in one single piece, in which is formed a flexible blade constituting a coupling articulation between said two segments.

3. A device as claimed in claim 1, in which said two segments are separately formed, and further comprising elastic means for urging said segments into contact with said bore.

4. A device as claimed in claim 1, in which said two semi-cylindrical segments constitute a ring which is carried by a cylindrical stud rigidly fixed to one of said members and engaged in an axial opening formed by two half-openings in the respective segments which open into the diametral slot separating said two segments.

5. A device as claimed in claim 4, in which the axial opening in said ring is eccentric.

6. A device as claimed in claim 1, in which said actuating means for bringing the two segments closer together are constituted by a lever having one of its extremities articulated on one of said segments and which comprises a portion co-operating in such manner with a complementary portion of the other segment, that the displacement of said lever in one direction brings the two segments closer together.

7. A device as claimed in claim 6, in which one of said co-operating portions is constituted by a surface forming a cam with respect to the other of said co-operating portions constituted by a stud fixed on the corresponding segment.

8. A device as claimed in claim 1, in which said at least one cam is formed by a straight sloping face disposed at an acute angle with the diametral plane of separation of said two segments.

9. A device as claimed in claim 1, in which said at least one counter-cam is constituted by a stud adapted to present a flat surface of contact with the corresponding one of said at least one cam.

10. A device as claimed in claim 9, in which said stud is fitted with a shoe adapted to present a flat contact surface with the corresponding cam.

11. A device as claimed in claim 9, in which said stud, is rigidly fixed to the corresponding segment and a sloping face is correspondingly formed on said other member.

12. A device as claimed in claim 4, for locking together in a single direction of movement two members movable in rotation with respect to each other, in which said two segments of said ring are restored to their initial form before radial expansion by their elasticity, said ring having a sloping face therein with a general radial orientation co-operating with said counter-cam so as to permit relative rotation of said ring in a direction opposite to the locking direction.

13. A device as claimed in claim 12, applied to a doorlock and mounted on the door-leaf, in which the rotating member is a pinion adapted to co-operate with a finger mounted on the fixed upright of the door-casing.

14. A device as claimed in claim 8, for locking together, in two directions, two members movable in rotation with respect to each other, in which said two straight sloping faces which constitute two cams of said at least one cam are mounted in opposition to each other.

15. A device as claimed in claim 9 in which said stud is rigidly fixed to one of said members and a sloping face is correspondingly formed in a window of the segment through which passes the corresponding stud.

References Cited

UNITED STATES PATENTS

| 2,624,396 | 1/1953 | Spraragen | 297—374 |
| 2,808,280 | 10/1957 | Ragsdale | 292—216 |

FOREIGN PATENTS

| 468,922 | 7/1937 | Great Britain | 16—140 |
| 1,002,082 | 8/1965 | Great Britain | 292—216 |

MARVIN A. CHAMPION, Primary Examiner

A. G. CRAIG, Jr., Assistant Examiner

U.S. Cl. X.R.

16—140; 188—78; 292—204; 297—374